(12) United States Patent
Simms (10) Patent No.: US 9,978,017 B1
(45) Date of Patent: May 22, 2018

(54) STATE CHANGE DETECTION AND BEHAVIORAL PREDICTION OF A NONLINEAR AND NON-STATIONARY SYSTEM

(71) Applicant: The Boeing Company, Chicago, IL (US)

(72) Inventor: Donald S. Simms, Ellicott City, MD (US)

(73) Assignee: THE BOEING COMPANY, Chicago, IL (US)

( * ) Notice: Subject to any disclaimer, the term of this patent is extended or adjusted under 35 U.S.C. 154(b) by 580 days.

(21) Appl. No.: 13/970,213

(22) Filed: Aug. 19, 2013

(51) Int. Cl.
  G06F 15/18 (2006.01)
  G06N 5/02 (2006.01)
(52) U.S. Cl.
  CPC ..................... *G06N 5/02* (2013.01)
(58) Field of Classification Search
  CPC .................................................. G06N 99/005
  USPC .............................................. 706/15, 45, 12
  See application file for complete search history.

(56) References Cited

U.S. PATENT DOCUMENTS 6,799,154 B1 * 9/2004 Aragones ............. G06F 11/008
  702/34
2008/0104006 A1 * 5/2008 Kiefer .................. G06N 99/005
  706/48
2009/0279443 A1 * 11/2009 Kim ....................... H04L 43/00
  370/252

OTHER PUBLICATIONS

National Institute of Standards & Technology (NIST), Engineering Statistics Handbook, Chapter 8, http://www.itl.nist.gov/div898/handbook/apr/section1/apr162.htm.*
Cao, J. et al., "On the Nonstationarity of Internet Traffic," Proceedings of the 2001 ACM SIGMETRICS International Conference on Measurement and Modeling of Computer Systems, vol. 29, Issue 1, Jun. 2001, 11 pages.
Salerno, J.J. et al., "Issues and Challenges in Higher Level Fusion: Threat/Impact Assessment and Intent Modeling (A Panel Summary)," IEEE 13th Conference on Information Fusion, 2010, 17 pages.

* cited by examiner

*Primary Examiner* — David R Vincent
(74) *Attorney, Agent, or Firm* — Toler Law Group, PC (57) ABSTRACT

A method includes performing a comparison, at a computing device, of first probability distribution function (PDF) parameters of a first data set to second PDF parameters of a second data set. The first data set and the second data set at least partially overlap. The method also includes determining, at the computer device, based on the comparison whether a state change occurs between the first data set and the second data set. The method further includes, in response to determining that the state change occurs, generating an indication of the state change.

20 Claims, 7 Drawing Sheets

STATE CHANGE DETECTION AND BEHAVIORAL PREDICTION OF A NONLINEAR AND NON-STATIONARY SYSTEM

FIELD OF THE DISCLOSURE

The present disclosure relates to state change detection and behavior prediction for data generated by nonlinear and non-stationary systems.

BACKGROUND

Conventional prediction methods may work well for data sets that change over time in a mathematically smooth manner (e.g., based on regression analysis or weighted averaging) or in a known sequence (e.g., based on pattern matching or Markov chains). However, these prediction methods often rely on an implicit assumption that a future state of the data depends predictably on a past state of the data. While this assumption may be true in some cases, the assumption may not be true in many real world situations where behavior changes can be both sudden and unexpected, such as for a nonlinear and non-stationary system (e.g., a system whose probability distribution function changes when shifted in time or space). The conventional prediction methods may not detect state changes and/or predict behaviors of a nonlinear and non-stationary system with a high degree of confidence.

SUMMARY

Systems and methods described herein may enable a computing device (e.g., a laptop computer, a mobile phone, a tablet computer) to detect state changes (e.g., changes in distributions of data) and/or to predict behaviors (e.g., to predict future values of output data) of a nonlinear and non-stationary system. For example, the nonlinear and non-stationary system may be described by or may generate data corresponding to a data set. The computing device may implement a process based on a probability distribution function to detect a change in state of the data (e.g., a change to trending in a new direction), to predict behavior of future data, or both.

In a particular embodiment, a first data set (e.g., a subset of data of a nonlinear and non-stationary system) is selected from a data set of the nonlinear and non-stationary system according to a placement of a lag window. A second data set may be selected from the data set of the nonlinear and non-stationary system according to a placement of a lead window. The first data set and the second data set may each include N data points. The second data set may overlap the first data set. For example, the second data set may overlap the first data set by at least half of the N data points in the first data set. To illustrate, when the first data set and the second data set each have 30 data points, the second data set may overlap the first data set by at least 15 data points.

When the data set corresponds to a temporal data set, the second data set may correspond to a data set that is shifted in time relative to the first data set (e.g., data of the second data set is generated subsequent to the generation of data of the first data set). When the data set corresponds to a non-temporal data set, the second data set may correspond to a data set that is shifted in orientation along a reference axis (e.g., shifted in space).

The computing device (e.g., a laptop computer, a mobile phone, a tablet computer) may be used to determine a first probability distribution functions (PDF) that describes the first data set. The first PDF may be described by first PDF parameters (e.g., shape parameters). The computing device may also determine a second PDF that describes the second data set. The second PDF may be described by second PDF parameters (e.g., shape parameters). For example, the first PDF and the second PDF may be Weibull PDFs. In this example, the first PDF parameters may include a first scale parameter and a first shape parameter of the first PDF, and the second PDF parameters may include a second scale parameter and a second shape parameter of the second PDF. When other PDFs are used, other PDF parameters may be used to describe them.

To determine whether there is a state change between the first data set and the second data set, values of the first PDF parameters and values of the second PDF parameters may be compared. A difference in the values of the first PDF parameters and the second PDF parameters may indicate that there is a state change between the first data set and the second data set. For example, when the difference exceeds a threshold, the difference may indicate a state change in the data set.

The difference in the values of the first PDF parameters and the second PDF parameters may also, or in the alternative, be extrapolated to determine PDF parameters for a subsequent PDF. For example, the values of the first PDF parameters and the second PDF parameters may be translated to vectors in a multi-dimensional space. To illustrate, when Weibull PDFS are used, the vectors may be in a two dimensional space where a first axis of the two dimensional space corresponds to values of a scale parameter and a second axis of the two dimensional space corresponds to values of a shape parameter. A difference of the vectors may be used to form a change vector that corresponds to the difference in the values of the first PDF parameters and the second PDF parameters. A Bayesian estimation process may be applied to the change vector to estimate a likely direction of the change vector. Based on the likely direction of the change vector, the PDF parameters of the subsequent PDF may be determined. The subsequent PDF may be used to determine projected values of data points of a subsequent data set in order to predict behavior of the data set.

In a particular embodiment, a method includes performing a comparison, at a computing device, of first probability distribution function (PDF) parameters of a first data set to second PDF parameters of a second data set. The first data set and the second data set at least partially overlap. The method also includes determining, at the computer device, based on the comparison whether a state change occurs between the first data set and the second data set. The method further includes, in response to determining that the state change occurs, generating an indication of the state change.

In another particular embodiment, an apparatus includes a processor and a memory coupled to the processor. The memory stores instructions executable by the processor to perform operations that include performing a comparison of first probability distribution function (PDF) parameters of a first data set to second PDF parameters of a second data set. The first data set and the second data set at least partially overlap. The operations also include determining based on the comparison whether a state change occurs between the first data set and the second data set. The operations further include, in response to determining that the state change occurs, generating an indication of the state change.

In another particular embodiment, a computer readable storage device stores instructions that, when executed by a processor, cause the processor to perform operations that include performing a comparison of first probability distribution function (PDF) parameters of a first data set to second PDF parameters of a second data set. The first data set and the second data set at least partially overlap. The operations also include determining based on the comparison whether a state change occurs between the first data set and the second data set. The operations further include, in response to determining that the state change occurs, generating an indication of the state change.

One particular advantage provided by at least one of the disclosed embodiments is an ability to detect state changes and/or predict behavioral (e.g., data output) of a nonlinear and non-stationary system. The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

Figure 1:
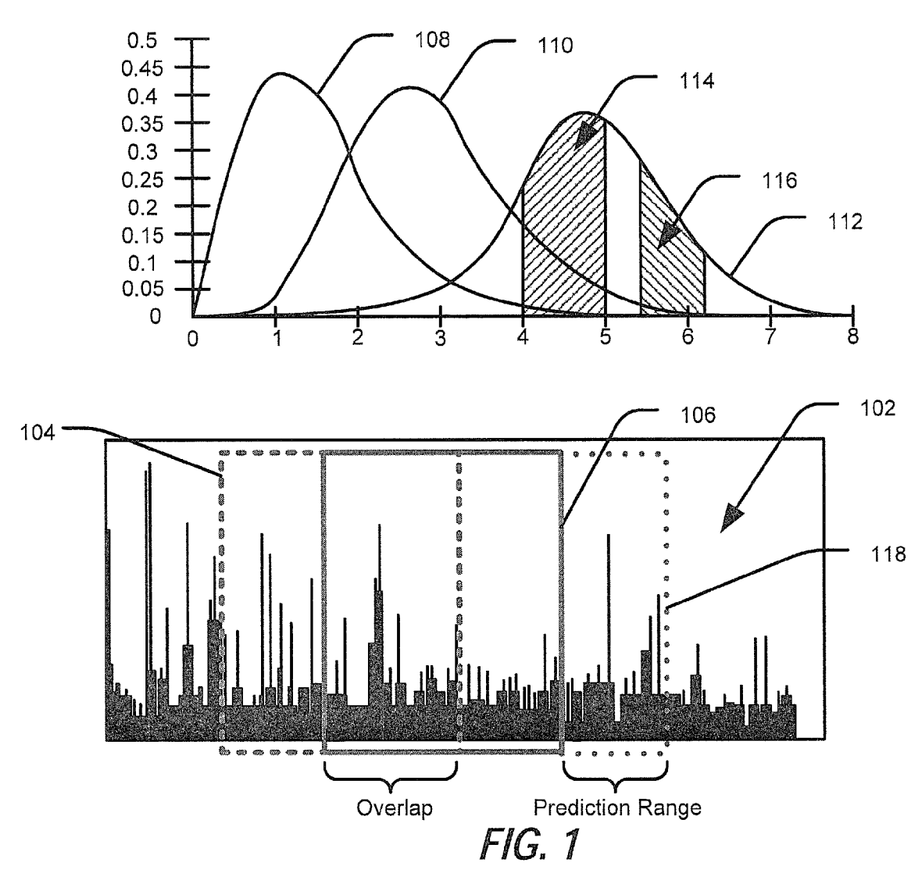
FIG. 1 is a diagram illustrating a particular embodiment of detecting state changes and/or predicting behavior of a nonlinear and non-stationary system.

FIG. 1 illustrates a particular embodiment of detecting state changes and/or predicting behavior of a nonlinear and non-stationary system (e.g., a system, a process, an entity, etc.). The nonlinear and non-stationary system may be described by a data set 102 or may generate the data set 102 as data output. For example, the data set 102 may represent network traffic data. In another example, the data set 102 may represent financial data (e.g., stock prices). In other examples, the data set 102 may include any nonlinear and non-stationary data set, which may be temporal or non-temporal. Examples of non-linear, non-stationary, and non-temporal data may include geographic locations of specified types of political events, temperature induced mode changes in electronic equipment, and crime rates within bounded areas.

A lag window 104 may define a first data set within the data set 102. The first data set may be a subset of the data set 102. A size of the lag window 104 may correspond to a number of data points in the first data set. A lead window 106 may define a second data set within the data set 102. The second data set may also be a subset of the data set 102. The lead window 106 may have the same size as the lag window 104, thus the second data set may include the same number of data points as the first data set. For example, each of the first data set and the second data set may include 30 data points. The first data set and the second data set may at least partially overlap. In an example, the first data set and the second data set may overlap by at least half of data points in the first data set. To illustrate, in the example above, the first data set and the second data set may overlap by at least 15 data points.

A first probability distribution function (PDF) associated with the first data set may be calculated using the data points in the first data set. A second PDF associated with the second data set may be calculated using the data points in the second data set. In a particular embodiment, the first PDF is a first Weibull PDF 108 that describes the first data set, and the second PDF is a second Weibull PDF 110 that describes the second data set. Although the following descriptions relates to Weibull PDFs, any continuous, asymmetric (i.e., in which the mean and the median may be differently located) PDFs may be used, such as chi-squared PDFs, Poisson PDFs, F-type PDFs, or Gamma PDFs.

A Weibull PDF is a continuous, asymmetric PDF that may be used to describe probabilities of a continuous random variable having particular values between an upper limit and a lower limit. For example, a probability that a value of the continuous random variable X is between 1 and 2 may be described using the Weibull PDF. The Weibull PDF may be represented using two parameters, a scale parameter and a shape parameter, that together describe the shape of the Weibull PDF. Thus, when values of the scale parameter and the shape parameter are known, a corresponding Weibull PDF may be determined.

The Weibull PDF may resemble an exponential PDF when the shape parameter has a value of 1 and may resemble a skewed Gaussian PDF when the shape parameter has a value greater than 1. Increasing a value of the scale parameter may flatten and spread the Weibull PDF (e.g., may create longer tails). When the value of the shape parameter is greater than 1, increasing the values of the scale parameter may move the peak of the Weibull PDF and skew to the right (e.g., create or elongate a left hand tail).

The first Weibull PDF 108 may be described by a first scale parameter and a first shape parameter, which may be denoted as variable parameters a and b, respectively. The first Weibull PDF 108 may be described according to Equation (1).

$$f(x) = \left(\frac{b}{a}\right) \times \left(\frac{x}{a}\right)^{b-1} \times e^{-\left(\frac{x}{a}\right)^b} \qquad \text{Equation (1)}$$

In Equation (1), f(x) is the first Weibull PDF 108, x is a value of a particular data point in the first data set, and e is the Euler's number.

The second Weibull PDF 110 may be described by a second scale parameter and a second shape parameter, which may be denoted as a' and b', respectively. The second Weibull PDF 110 may be described according to Equation (2).

$$f(x') = \left(\frac{b'}{a'}\right) \times \left(\frac{x}{a'}\right)^{b'-1} \times e^{-(\frac{x}{a'})^{b'}} \qquad \text{Equation (2)}$$

In Equation (2), f(x') is the second Weibull PDF 110 and x' is a value of a particular data point in the second data set.

In a particular embodiment, when future behavior or states of a data set are to be predicted, the first PDF and the second PDF may be used to project a subsequent PDF (e.g., a PDF of a subsequent or future data set). In this embodiment, a subsequent Weibull PDF 112 may be determined based on the values of subsequent PDF parameters according to Equation (3).

$$f(x'') = \left(\frac{b''}{a''}\right) \times \left(\frac{x''}{a''}\right)^{b''-1} \times e^{-(x''/a'')^{b''}} \qquad \text{Equation (3)}$$

In Equation (3), f(x") is the subsequent Weibull PDF 112 and x" is a projected value of a particular data point of the subsequent data set.

Thus, using Equation (3), the subsequent Weibull PDF 112 may be used to project values of data points of the subsequent data set. For example, a region 114 may indicate a cumulative probability that a value of a particular data point is between 4 and 5. The cumulative probability may be found by calculating an integration of the region 114. As another example, a region 116 may indicate another cumulative probability that the value of the particular data point is between 5.3 and 6.1. The projected values of data points may be determined without a noise reduction operation (e.g., filtering, smoothing, etc.) as the data set 102 is assumed not to include any noise.

The subsequent Weibull PDF 112 may be used to predict values of data points that are subsequent to the data points of the second data set, as described further below. For example, the subsequent Weibull PDF 112 may be used to predict values of a number of subsequent data points. In a particular embodiment, the number of subsequent data points that can be predicted is equal to a difference between the number of data points in the second data set and the number of data points that are overlapped by the first data set and the second data set (as indicated by a window 118). To illustrate, when the second data set include 20 data points, and the first data set and the second data set overlap by 15 data points, the subsequent Weibull PDF 112 may be used to determine or predict values of up to 5 subsequent data points.

When values of a, b, a' and b' are determined, the differences in the values of (a, b) relative to (a', b') may be used to detect whether a state change has occurred. A state change may indicate that between the first data set and the second data set, a significant change in the PDFs occurs. To illustrate, in the specific example of FIG. 1, when the first Weibull PDF 108 different than the second Weibull PDF 110, this is an indication that the data set has undergone a state change. While comparing the parameters of the first Weibull PDF 108 and the second Weibull PDF 110 may be used to detect every state change of the nonlinear and non-stationary system, some of the state changes may be considered to be insignificant. Thus, a state change may only be indicated when a change in the PDF of the data set (e.g., a difference between the first Weibull PDF 108 and the second Weibull PDF 110) satisfies a threshold. In a particular embodiment, the threshold may be predetermined or user configurable based on the particular data set being analyzed. In another embodiment, as described further with reference to FIG. 3, the threshold may be automatically determined.

The differences in the values of a and b relative to the values of a' and b' may also be used to predict values of subsequent, future PDF parameters (e.g., a subsequent scale parameter and a subsequent shape parameter) of a subsequent Weibull PDF 112 according to Equations (4)-(8). The subsequent scale parameter and the subsequent shape parameter may be denoted as variable parameters a" and b", respectively. For example, the values of the subsequent PDF parameters may be determined using extrapolation of the differences in the values of a and b relative to the values of a' and b' in vector space, which is described in more detail with reference to FIG. 2. The motion of the vector formed by the values of a and b and a' and b', either by change in magnitude or rotation angle in the a-b plane, can be extrapolated to a likely future position a" and b" using a non-linear estimation technique applied to the two points identified in the lag and lead parameter estimates.

When a'>a, $$a'' = a' \times \left[\frac{(1-e^{-3k})}{(1-e^{-2k})}\right] \qquad \text{Equation (4)}$$

In Equation (4), k=−ln [(a'/a)−1].

When $a'<a, a''=axe^{-2k}$ \qquad Equation (5)

In Equation (5), k=ln [(a/a')].
When b'>b, $$b'' = b' \times \left[\frac{(1-e^{-3k})}{(1-e^{-2k})}\right] \qquad \text{Equation (6)}$$

In Equation (6), k=−ln [(b'/b)−1].

When $b'<b, b''=bxe^{-2k}$ \qquad Equation (7)

In Equation (7), k=ln [(b/b')].
Values of data points at different particular probabilities may be determined according to Equation (8).

$$x'' = -a''[\ln(1-p)]^{-1/b''} \qquad \text{Equation (8)}$$

In Equation (8), x" is a projected value of a data point within a prediction range (e.g., after the second data set) and p is a probability value. For example, a projected median probability value of the data point may be determined by using the Equation (8) to derive a first value of the data point at a probability of 55% (i.e., p=0.55) and a second value of the data point at a probability of 45% (i.e., p=0.45). The two derived values may indicate the median value with an error rate of ±5%. For example, a region 114 of the subsequent Weibull PDF 112 may indicate a cumulative probability that a value of a data point within the region 114 is between 4 and 5.

Thus, using operations described with respect to FIG. 1, a computing device may be able to detect state changes of a nonlinear and non-stationary system. In addition, the computing device may be able to predict behavior of the nonlinear and non-stationary system using the described operations with respect to FIG. 1.

Figure 2:
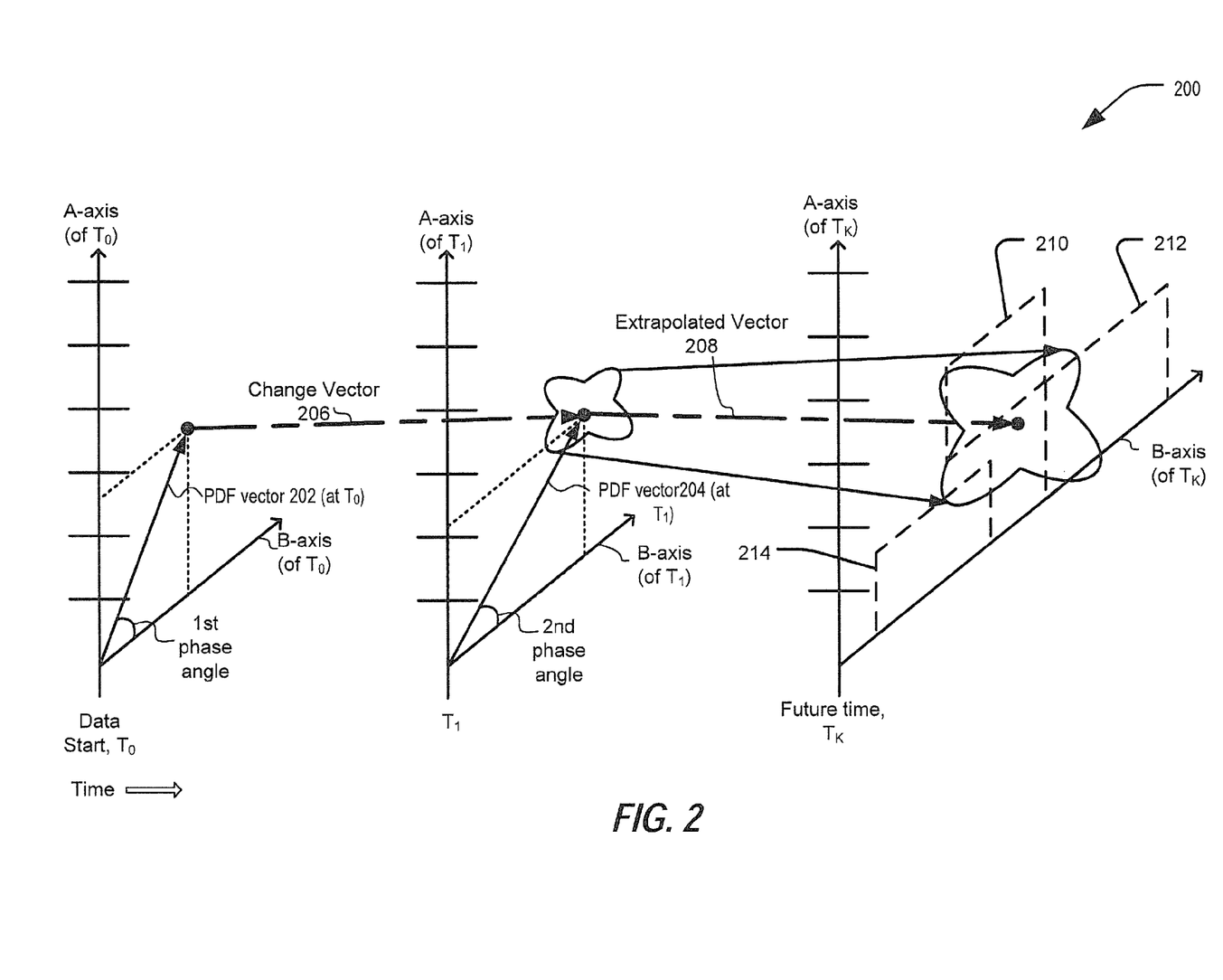
FIG. 2 is diagram illustrating another particular embodiment of detecting behavioral state changes and/or predicting behavioral of a nonlinear and non-stationary system in multi-dimensional vector space.

FIG. 2 illustrates another particular embodiment of detecting state changes and/or predicting behavior of the nonlinear and non-stationary system of FIG. 1 in multi-dimensional vector space. The number of dimensions of the multi-dimensional vector space may correspond to the number of parameters of a probability distribution function (PDF) used to describe a data set. For example, when a Weibull PDF is used, the multi-dimensional vector space may be a 2-dimensional vector space because the Weibull PDF has two associated parameters (e.g., a scale parameter and a shape parameter). When the data set is a temporal data set, the multi-dimensional vector space may also include a time dimension.

Parameters associated with the PDF used to describe a data set (e.g., a scale parameter and a shape parameter of a Weibull PDF) may be translated to a vector having an associated magnitude and a phase angle. A difference between two vectors (e.g., a first vector corresponding to the first data set and a second vector corresponding to the second data set) may be determined by determining differences in the magnitudes and phase angles of the vectors. Thus, parameters associated with the first PDF and parameters associated with the second PDF may be translated to vectors in multi-dimensional vector space. A state change between the first PDF and the second PDF may be determined using the difference between the two vectors. Further, the state change may be represented as a change vector and parameters associated with a PDF that describes the state change may be determined using the change vector.

To illustrate, Weibull PDFs are used in the example illustrated in FIG. 2. A first vector 202 may be formed using the values of (a, b) and a second vector 204 may be formed using the values of (a', b') in a two dimensional space (e.g., a vector space with two axis). A change vector 206 may be formed using a difference in magnitude between the first vector and the second vector and a difference in phase angle between the first vector 202 and the second vector 204. The vector space may have a number of dimensions that is equal to the number of parameters of a PDF (e.g., the first Weibull PDF 108 or the second Weibull PDF 110) that is used to detect state changes and/or to predict behaviors of the nonlinear and non-stationary system of FIG. 1. Additionally, in the example illustrated in FIG. 2, the vector space includes a time dimension.

A future vector (corresponding to predicted values of a" and b") may be predicted by extrapolating along the change vector. For example, the difference in magnitude may be extrapolated to determine a subsequent magnitude of the change vector (e.g., at a time $T_k$). The difference in phase angle may also be extrapolated to determine a subsequent phase angle of the change vector (e.g., at the time $T_k$). Based on the extrapolated subsequent magnitude and the extrapolated subsequent phase angle, an extrapolated vector 208 may be formed. The extrapolated vector 208 may indicate the values of a" and b". In a particular embodiment, the values of a" and b" or other information determined based on the values of a" and b", such as a predicted range of future data values, may be reported (e.g., via a graphical user interface (GUI)).

In a particular embodiment, the extrapolated vector 208 may indicate different subsequent states based on operational context of the data set. The subsequent state may be reported instead of or in addition to the values of a" and b". For example, the operational context of the data set may be that the data set corresponds to prices of a stock. In this example, a first subsequent state 210, a second subsequent state 212, and a third subsequent state 214 may correspond to values of a" and b" in different ranges. To illustrate, the first subsequent state 210 may correspond to values of a" and b" in a first range (e.g., a"<52 and 1.5<b"<3.5). The values of a" and b" in the first range may correspond to particular PDFs that indicates a strong likelihood (e.g., greater than 50%) that the price of the stock will increase at a time $T_k$ (e.g., a subsequent time). Thus, the first subsequent state 210 may correspond to a likely increase in price. A second subsequent state 212 may include the values of a" and b" in a second range. The values of a" and b" in the second range may correspond to particular PDFs that indicates a strong likelihood (e.g., greater than 50%) that the price of the stock will decrease at the time $T_k$. Thus, the second subsequent state 212 may correspond to a likely decrease in price. A third subsequent state 214 may include the values of a" and b" in a third range. The values of a" and b" in the third range may correspond to particular PDFs that indicates a strong likelihood (e.g., greater than 50%) that the price of the stock will be stable (e.g., neither increase nor decrease more than a threshold amount) at the time $T_k$. Thus, the second subsequent state 212 may correspond to a likely stable price. Based on the extrapolated vector 208, the first subsequent state 210, the second subsequent state 212, the third subsequent state 214, or an indeterminate state may be reported. For example, an indicator corresponding to one of the states may be output via a graphical user interface. In another example, an indicator corresponding to one of the states may be output to an application or control system that performs an action (such as executing a stock transaction) responsive to the indicator.

In a particular embodiment, if the values of a" and b" fall into more than one range, e.g., the first range and the second range, a Bayesian decision process may be used to determine the probabilities of each subsequent state. For example, the Bayesian decision process may use the change vector as a priori information to rank the probabilities of each subsequent state. To illustrate, when the change vector 206 is oriented in a direction that favors the first subsequent state 210, the first subsequent state 210 is ranked higher than the second subsequent state 212 in terms of probabilities. When the change vector 206 is oriented in a direction that favors the second subsequent state 212, the second subsequent state 212 is ranked higher than the first subsequent state 210 in terms of probabilities. Thus, when the values of a" and b" fall into both the first range and the second range, only one subsequent state may be reported via the GUI.

Figure 3:
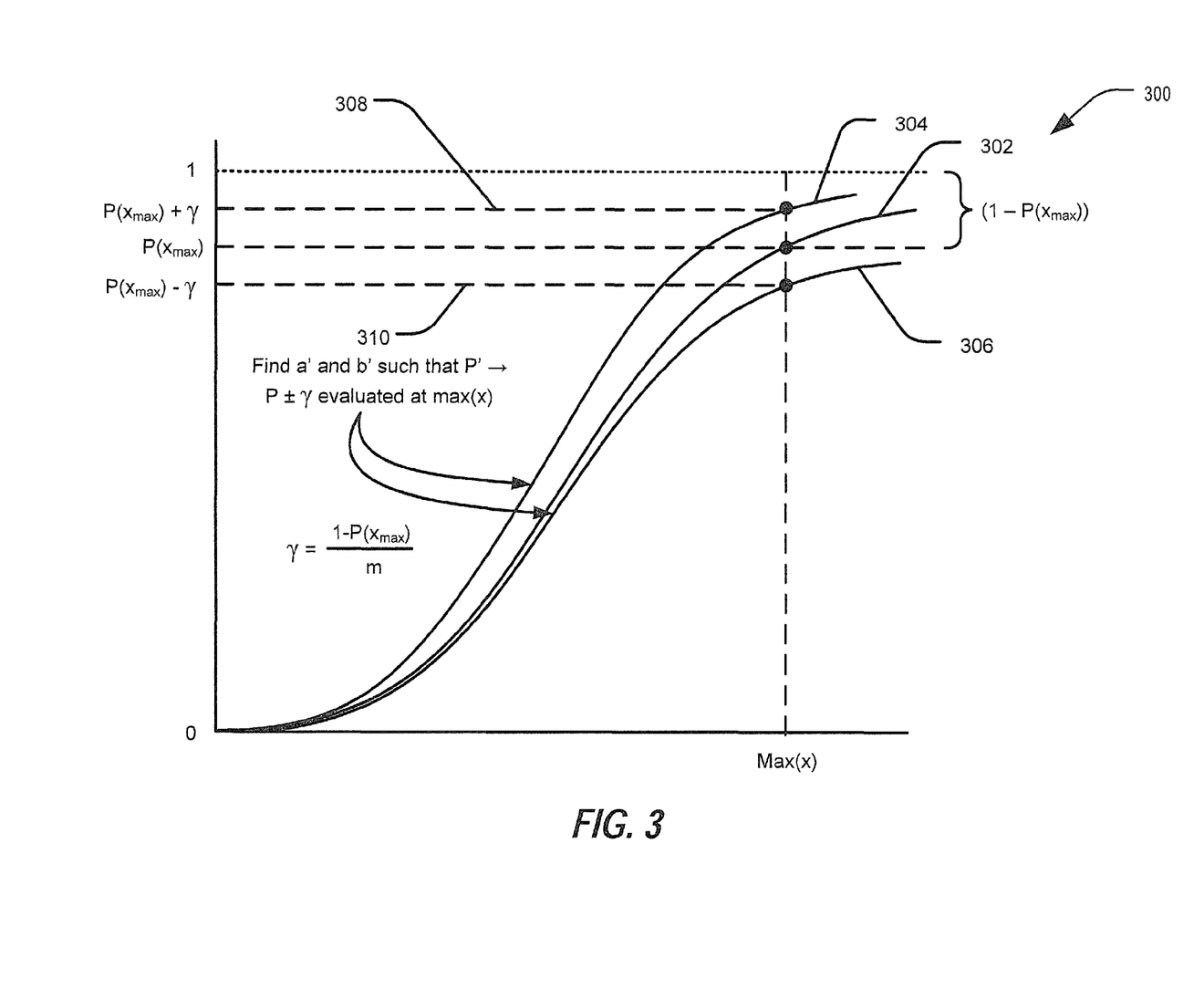
FIG. 3 is a diagram illustrating a particular embodiment of calculating a state change threshold of the nonlinear and non-stationary system of FIG. 1.

FIG. 3 is a diagram illustrating a particular embodiment of calculating a state change threshold of the nonlinear and non-stationary system of FIG. 1. As explained above, in a particular embodiment, every state change of a nonlinear and non-stationary system may be detected and reported. However, in another embodiment, some of the state changes may be considered to be insignificant. Accordingly, only "significant" state changes may be detected and reported. A significant state change may be detected when a probability distribution function (PDF) of a data set changes by an amount that satisfies a threshold. For example, a significant state change may be detected when a difference between a first PDF corresponding to a first subset of the data set (e.g., the first Weibull PDF 108) and a second PDF corresponding to a second subset of the data set (e.g., the second Weibull PDF 110) exceeds a state change threshold. FIG. 3 illustrates a particular method of automatically determining thresholds for significant state change detection based on the data set.

In a particular embodiment, any changes in value from a' to a and/or b' to b that exceeds the state change threshold, which is denoted $\gamma$, may indicate a significant state change.

γ may be determined according to Equation (9).

$$\gamma = \frac{(1 - p(x_{max}))}{m}$$  Equation (9)

Where m is a sensitivity value that is greater than 1, and $p(x_{max})$ is a cumulative distribution function (CDF) of the first data set evaluated at a data point having a maximum value within the first data set. In a particular embodiment, m=2 is used to determine the state change threshold, and $p(x_{max})$ is a Weibull CDF of the first data set evaluated at a data point having a maximum value within the first data set.

$p(x_{max})$ may be determined according to Equation (10).

$$p(x_{max}) = 1 - \exp\left[-\left(\frac{x_{max}}{a}\right)^b\right]$$  Equation (10)

Where $x_{max}$ is a value of the data point within the first data set that has the maximum value. $p(x_{max})$ may be evaluated as an integrated value of the first Weibull PDF.

As the value of $p(x_{max})$ depends on the values of a and b and the value of γ depends on the value of $p(x_{max})$, every time the value of a and/or b changes, the value of γ automatically changes as well. Thus, γ may be calculated without any a priori data (e.g., historical values of a and/or b) and any external data.

A significant state change may be determined according to Equation (11) and/or Equation (12). The Equation (11) and the Equation (12) may correspond to a change of total integrated probability (e.g., a change from $p(x_{max})$ to $p'(x_{max})$).

$$(1 - p'(x_{max})) \le \frac{(m-1)}{m} \times (1 - p(x_{max}))$$  Equation (11)

$$(1 - p'(x_{max})) \ge \frac{(m-1)}{m} \times (1 - p(x_{max}))$$  Equation (12)

Where $p'(x_{max})$ is a CDF of the second data set evaluated at the data point within the first data set that has the maximum value. In a particular embodiment, $p'(x_{max})$ is a Weibull CDF of the second data set evaluated at the data point within the first data set that has the maximum value. $p'(x_{max})$ may be evaluated as an integrated value of the first Weibull PDF.

$p'(x_{max})$ may be determined according to Equation (13).

$$p'(x_{max}) = 1 - \exp\left[-\left(\frac{x_{max}}{a'}\right)^{b'}\right]$$  Equation (13)

Where $x_{max}$ is data point within the first set that has the maximum value.

The values of a' and b' that result in a significant state change may be determined by solving either the Equation (11) or the Equation (12). Using the Equation (11) as an example, the values of a' and b' that result in a significant state change may be determined according to Equations (14)-(20).

The Equation (11) may be transformed to the Equation (14) using the Equation (10) and the Equation (13).

$$\exp\left[-\left(\frac{x_{max}}{a}\right)^b\right] \ge \frac{m}{(m-1)} \times \exp\left[-\left(\frac{x_{max}}{a'}\right)^{b'}\right]$$  Equation (14)

To solve for a', b' may be held constant (e.g., set to b'=b=a constant value). Taking the bth root of the Equation (14) yields Equation (15):

$$\exp\left[-\left(\frac{x_{max}}{a}\right)^b\right] = \left(\frac{m}{(m-1)}\right)^{1/b} \times \exp\left[-\left(\frac{x_{max}}{a'}\right)^{b'}\right]$$  Equation (15)

Taking the natural log of both sides of the Equation (15) yields Equation (16):

$$-\frac{x_{max}}{a} = \frac{1}{b} \times \ln\left(\frac{m}{(m-1)}\right) - \frac{x_{max}}{a'}$$  Equation (16)

Isolating a' in the Equation (16) yields Equation (17) which may be used to solve for a'.

$$a' = \frac{a \times b \times x_{max}}{a \cdot \ln\left(\frac{m}{m-1}\right) + (b \times x_{max})}$$  Equation (17)

To solve for b', a' may be held constant (e.g., set to a'=a=constant) and an assignment made be made according to Equation (18).

$$u = \exp\left[-\left(\frac{x_{max}}{a}\right)\right]$$  Equation (18)

The Equation (18) may be plugged into the Equation (14) to yield Equation (19).

$$u^b = \frac{m}{m-1} \times u^{b'}$$  Equation (19)

Taking the natural log of both sides of the Equation (19) and isolating for b' yields Equation (20).

$$b' = \frac{(b \times \ln(u)) - \ln\left(\frac{m}{m-1}\right)}{\ln(u)}$$  Equation (20)

Substituting u back to the Equation (20) yields Equation (21) that may be used to solve for b'.

A particular embodiment of determining significant state changes may be illustrated in graphical form in FIG. 3. A curve 302 may correspond to the Weibull CDF of the first data set evaluated at all of the data points in the first data set. A curve 304 may correspond to sums of the Weibull CDF of the first data set evaluated at all of the data points in the first data set and the state change threshold γ. A curve 306 may correspond to differences of the Weibull CDF of the first data set evaluated at all of the data points in the first data set and γ.

A line 308 may intersect a point on the curve 304 corresponding to a sum of the Weibull CDF of the first data set evaluated at the data point of the first data set that has the maximum value. The line 308 may correspond to an upper limit of γ. A line 310 may intersect a point on the curve 306 corresponding to a difference of the Weibull CDF of the first data set evaluated at the data point of the first data set that has the maximum value. The line 308 may correspond to a lower limit of γ.

To determine whether a significant state change has occurred, the values of a' and b' may be plugged into the Equation (13) and the value of p'($x_{max}$) may be plotted in the graph. When the value of p'($x_{max}$) is at a coordinate on the graph that is between the line 308 and the line 310, no significant state change has occurred as the values of a' and/or b' has not changed by an amount (relative to the values of a and/or b) that exceeds γ. When the value of p'($x_{max}$) is at a coordinate on the graph that is above the line 308, a significant state change has occurred as the values of a' and/or b' has changed by a positive amount (relative to the values of a and/or b) that exceeds γ. When the value of p'($x_{max}$) is at a coordinate on the graph that is below the line 310, a significant state change has occurred as the values of a' and/or b' has changed by a negative amount (relative to the values of a and/or b) that exceeds γ.

Figure 4:
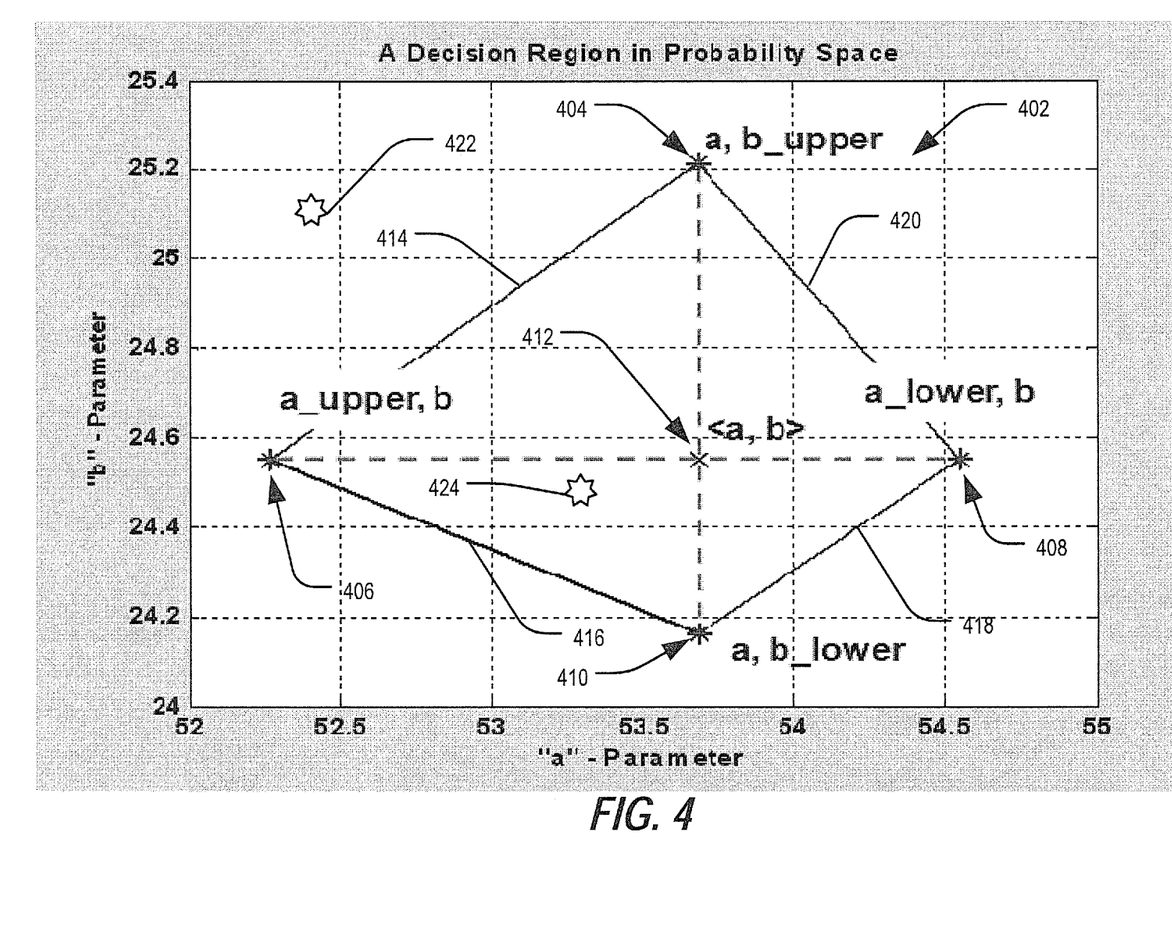
FIG. 4 is a diagram illustrating another particular embodiment of calculating a state change threshold of the nonlinear and non-stationary system of FIG. 1 in probability space.

FIG. 4 illustrates a particular embodiment of calculating a state change threshold of the nonlinear and non-stationary system of FIG. 1 in probability space. A quadrilateral 402 may correspond to a boundary of potential values of a' and b' that result in a significant change in probability space. The quadrilateral 402 may be defined by p($x_{max}$)+γ and p($x_{max}$)−γ that correspond to bounding parameter values of a and b. p($x_{max}$)+γ may correspond to either a positive change in a' relative to a, a positive change in b' relative to b, or positive changes in both a' and b'. p($x_{max}$)−γ may correspond to either a negative change in a' relative to a, a negative change in b' relative to b, or negative changes in both a' and b'. For example, a first coordinate 404 may correspond to a least amount of positive change in b' alone (i.e., when a' is unchanged relative to a) that results in a significant state change. A second coordinate 406 may correspond to a least amount of positive change in a' alone (i.e., when b' is unchanged relative to b). A third coordinate 408 may correspond to a least amount of negative change in a' alone (i.e., when b' is unchanged relative to b) that results in a significant state change. A fourth coordinate 410 may correspond to a least amount of negative change in a' alone (i.e., when b' is unchanged relative to b). A fifth coordinate 412 may correspond to the values of a and b.

The quadrilateral 402 may include four bounding lines. A first bounding line 414 may correspond to a least amount of positive changes in both a' and b' that result in a significant state change. A second bounding line 416 may correspond to a least amount of positive change in a' and a least amount of negative b' that result in a significant state change. A third bounding line 418 may correspond to a least amount of negative changes in both a' and b' that result in a significant state change. A fourth bounding line 420 may correspond to a least amount of negative change in a' and a least amount of positive change in b' that result in a significant state change.

When the values of a' and b' are determined (e.g., by using the Equation (17) and the Equation (20)), a new coordinate corresponding to the values of a' and b' may be determined in the probability space. When the new coordinate is outside the bounding lines 416-420 (e.g., at a location 422), a significant state change has occurred. The significant state change may be reported via the GUI. When the new coordinate is inside the bounding lines 416-410 (e.g., at a location 424), an insignificant state change has occurred.

Figure 5:
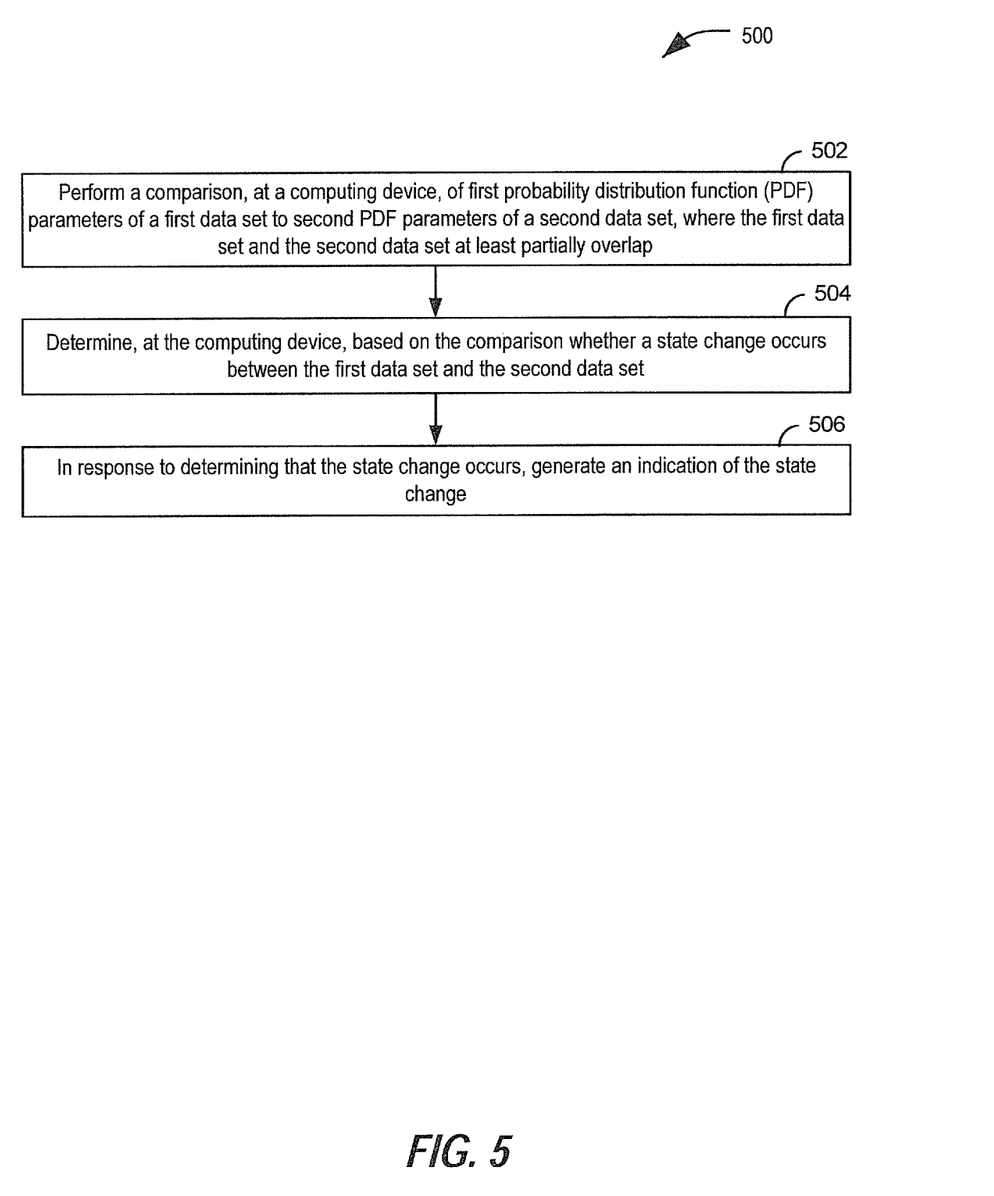
FIG. 5 is a flow diagram of a particular embodiment of a method to detect state changes and/or to predict behavior of the nonlinear and non-stationary system of FIG. 1.

FIG. 5 is a flow diagram that illustrates a method 500 to detect state changes and/or to predict behavioral of the nonlinear and non-stationary system of FIG. 1 according to a particular embodiment. The method 500 includes performing a comparison, at a computing device, of first probability distribution function (PDF) parameters of a first data set to second PDF parameters of a second data set, at 502. The first data set and the second data set at least partially overlap. For example, referring to FIG. 1, the first PDF parameters may correspond to the first Weibull PDF 108, and the second PDF parameters may correspond to the second Weibull PDF 110.

The method 500 also includes determining, at the computing device, based on the comparison whether a state change occurs between the first data set and the second data set, at 504. For example, referring to FIG. 1, the differences in the values of (a, b) relative to (a', b') may be compared to detect whether a state change has occurred. The method 500 further includes, in response to determining that the state change occurs, generating an indication of the state change, at 506. For example, referring to FIG. 2, based on the extrapolated vector 208, either the first subsequent state 210 or the second subsequent state 212 may be reported (e.g., via a graphical user interface or other data output). Thus, the method 500 may enable a computing device to detect state changes and/or to predict behavioral of a nonlinear and non-stationary system.

Figure 6:
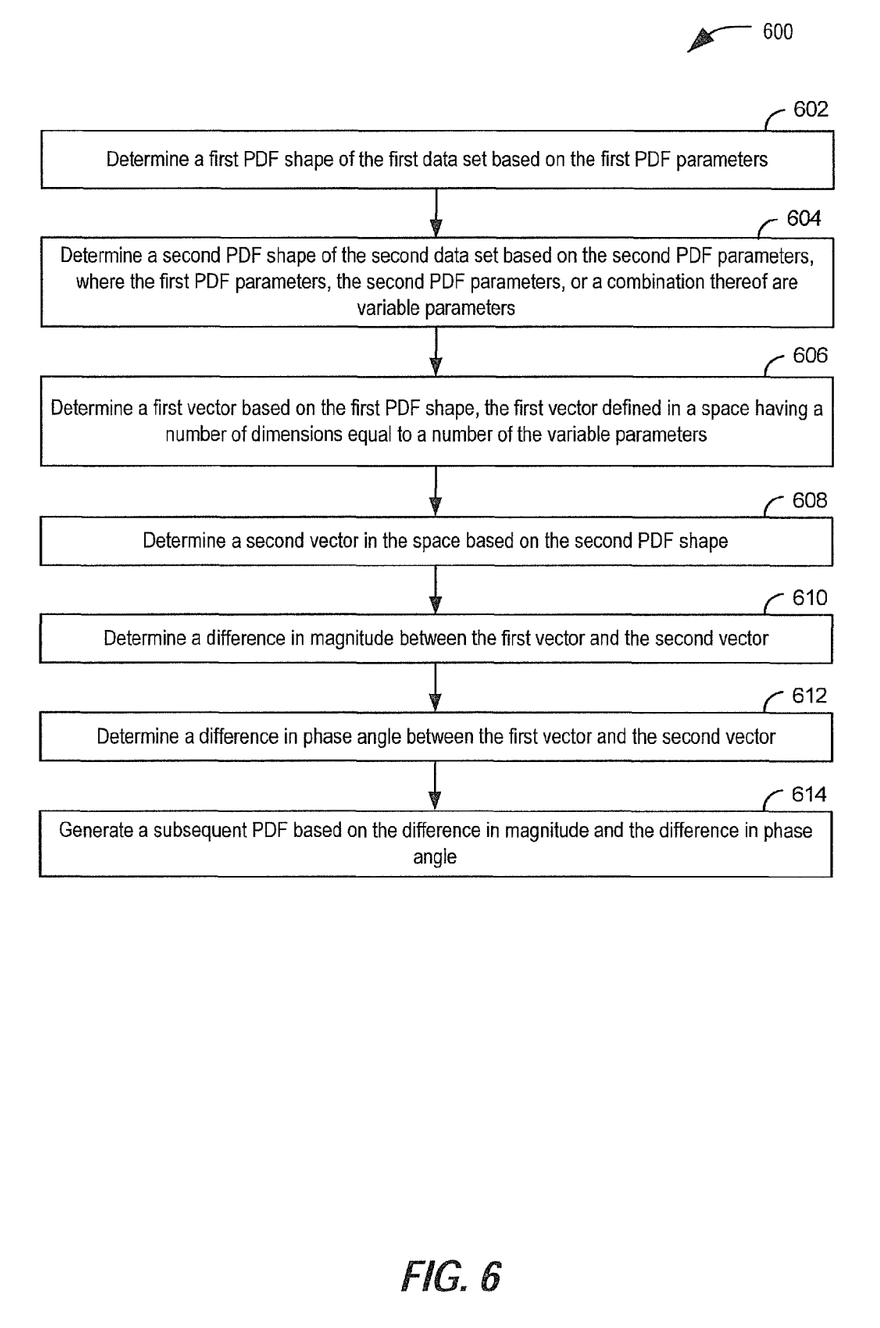
FIG. 6 is a flow diagram of another particular embodiment of a method to detect state changes and/or to predict behavior of the nonlinear and non-stationary system of FIG. 1.

FIG. 6 is a flow diagram that illustrates a method 600 to detect state changes and/or to predict behavior of the nonlinear and non-stationary system of FIG. 1. The method 600 includes determining a first PDF shape of a first data set based on first PDF parameters, at 602. For example, referring to FIG. 1, the first Weibull PDF 108 may be described by a first scale parameter and a first shape parameter (i.e., a first shape of the first Weibull PDF 108). The method 600 also includes determining a second PDF shape of a second data set based on second PDF parameters, at 604. The first PDF parameters, the second PDF parameters, or a combination thereof, are variable parameters. For example, referring to FIG. 1, the second Weibull PDF 110 may be described by the second scale parameter and the second shape parameter. The method 600 further includes determining a first vector based on the first PDF shape. The first vector may be defined in a space having a number of dimensions equal to a number of the variable parameters, at 606. For example, referring to FIG. 2, the first vector 202 may be formed using the values of (a, b) in the two dimensional space (e.g., a vector space with two axis).

The method 600 further includes determining a second vector in the space based on the second PDF shape, at 608. For example, referring to FIG. 2, the second vector 204 may be formed using the values of (a', b') in the two dimensional space (e.g., a vector space with two axes). The method 600 further includes determining a difference in magnitude between the first vector and the second vector, at 610. The method 600 further includes determining a difference in phase angle between the first vector and the second vector, at 612. For example, referring to FIG. 2, the change vector 206 may be formed using a difference in magnitude between the first vector and the second vector and a difference in phase angle between the first vector 202 and the second vector 204. The method 600 further includes generating a subsequent PDF based on the difference in magnitude and the difference in phase angle, at 614. For example, referring to FIG. 2, the change vector 206 may be extrapolated to determine parameters corresponding to the subsequent PDF.

In a particular embodiment, the subsequent PDF may be used to predict behavior of the nonlinear and non-stationary system (e.g., future values of the data set). Additionally, or in the alternative, the first PDF shape and the second PDF shape may be compared to detect a state change. Thus, the method 600 may enable a computing device to detect state changes and/or to predict behavioral of the nonlinear and non-stationary system.

Figure 7:
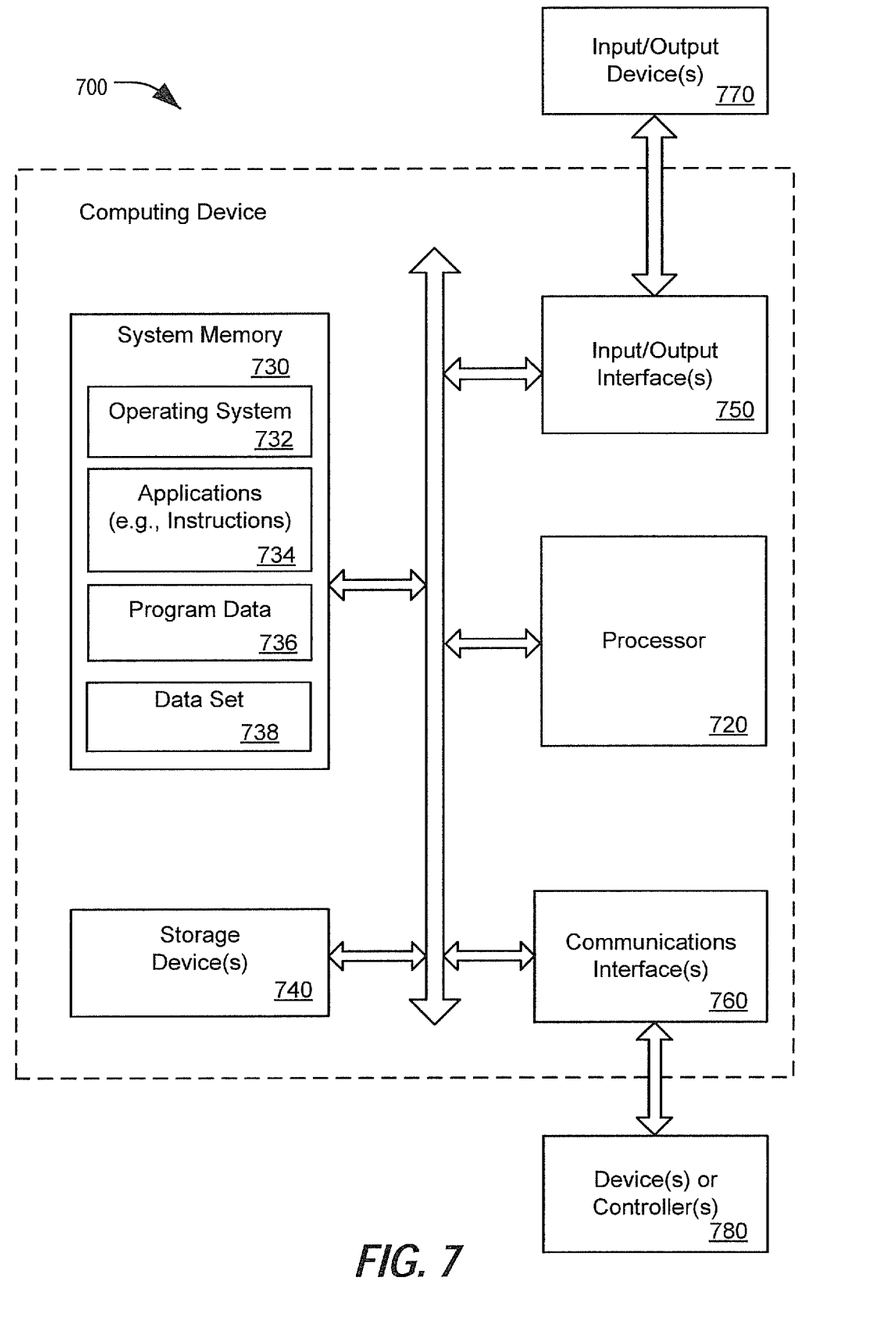
FIG. 7 is a block diagram illustrating a particular embodiment of a computing device that is operable to detect state changes and/or to predict behavior of the nonlinear and non-stationary system of FIG. 1.

FIG. 7 is a block diagram that illustrates a computing device 700 that is operable to detect state changes and/or to predict behavior of the nonlinear and non-stationary system of FIG. 1. The computing device 700 may include at least one processor 720. Within the computing device 700, the at least one processor 720 may communicate with a system memory 730, one or more storage devices 740, one or more input/output interfaces 750, one or more communications interfaces 760, or a combination thereof.

The system memory 730 may include volatile memory devices (e.g., random access memory (RAM) devices), nonvolatile memory devices (e.g., read-only memory (ROM) devices, programmable read-only memory, and flash memory), or both. The system memory 730 may include an operating system 732, which may include a basic input/output system for booting the computing device 700 as well as a full operating system to enable the computing device 700 to interact with users, other programs, and other devices. The system memory 730 may also include one or more applications (e.g., instructions) 734, program data 736, and data set 638 set 738 (e.g., the data set 102 of FIG. 1). The data set 738 may be data output of a nonlinear and non-stationary system. Examples of the program data 736 may include data used by the applications 734 to perform respective functions of the applications 734. The applications 734 may include instructions executable by the at least one processor 720 to determine state changes and/or predict behaviors of the data set 738. For example, the application 734 may include instructions that are executable by the at least one processor 720 to perform the method 600 of FIG. 6, the method 700 of FIG. 7, or a combination thereof. In another example, the application 734 may include instructions that are executable by the at least one processor 720 to determine probability distribution functions (PDFs) associated with a data set and to analyze the PDFs, as described with reference to FIG. 1, FIG. 2, FIG. 3, or a combination thereof, to detect state changes in the data set, to predict behavior of the data set, or both.

The one or more storage devices 740 may include nonvolatile storage devices, such as magnetic disks, optical disks, or flash memory devices. The storage devices 740 may include both removable and non-removable memory devices. In a particular embodiment, the storage devices 740 may be configured to store the operating system 732, the applications 734, the program data 736, the data set 738, or a combination thereof. The system memory 730, the storage devices 740, or both, may include tangible, non-transitory computer-readable media or storage devices.

In a particular embodiment, the at least one processor 720 is configured to execute computer executable instructions, such as the applications 734, stored at a non-transitory computer-readable medium, such as the system memory 730. The instructions may be executable to cause the at least one processor 720 to perform operations that include performing a comparison, at the computing device 700, of first probability distribution function (PDF) parameters of a first data set to second PDF parameters of a second data set. The first data set and the second data set at least partially overlap. The operations also include determining, at the computer device, based on the comparison whether a state change occurs between the first data set and the second data set. The operations further include, in response to determining that the state change occurs, generating an indication of the state change.

The one or more input/output interfaces 750 may enable the computing device 700 to communicate with one or more input/output devices 770 to facilitate user interaction. For example, the one or more input/output interfaces 750 may be adapted to receive input from a user, to receive input from another computing device, or a combination thereof. The input/output interfaces 750 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 770 may include user interface devices and displays, including some combination of buttons, keyboards, pointing devices, displays, speakers, microphones, touch screens, and other devices. The input/output devices 770 may alert a user regarding a state change or display predicted behavior of a nonlinear and non-stationary system based on information sent via the one or more input/output interfaces 750.

The one or more communications interfaces 760 may enable the computing device 700 to communicate with one or more other computing devices or controllers 780. The one or more communications interfaces 760 may include wired Ethernet interfaces, Institute of Electrical and Electronics Engineers (IEEE) wireless interfaces, electrical (or power line) interfaces, optical or radio frequency interfaces, or other wired or wireless interfaces. The other computer devices or controllers 780 may include host computers, servers, workstations, portable computers, telephones, tablet computers, or any other communication device or component. In an example, the computing device 700 may receive data sets as data streams from the other computer devices or controllers 780 in real time. The data sets may include stock prices, network traffic data, etc. The computing device 700 may evaluate the data sets to detect state changes and/or predict future values of the data sets.

Examples described above illustrate but do not limit the disclosure. It should also be understood that numerous modifications and variations are possible in accordance with the principles of the present disclosure. Accordingly, the scope of the disclosure is defined only by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. A method comprising:
    performing a comparison, at a computing device, of first probability distribution function (PDF) parameters of a first data set to second PDF parameters of a second data set, wherein the first data set and second data set are subsets of a data output, and
    wherein:
        the first data set and the second data set partially overlap,
        the first PDF parameters include first shape parameters indicating a first shape of a first PDF of the first data set,
        the second PDF parameters include second shape parameters indicating a second shape of a second PDF of the second data set,
        the first data set and the second data set are nonlinear and non-stationary and
        the first data set and the second data set describes at least one of an amount, a frequency, or a location of particular events;
    determining, at the computing device, bounding parameter values based on the first PDF parameters;
    determining, at the computing device, that a state change occurs between the first data set and the second data set when values of the second PDF parameters are not within the bounding parameter values;
    generating, at the computing device, an indication of the state change as third shape parameters to predict future values of a subsequent data set of the data output in response to determining that the state change occurs; and
    displaying the indication at a display device.

2. The method of claim 1, wherein determining that the state change occurs includes:
    determining the first shape based on the first PDF parameters;
    determining the second shape based on the second PDF parameters, wherein the first PDF parameters, the second PDF parameters, or a combination thereof are variable parameters;
    determining a first vector based on the first shape, the first vector defined in a space having a number of dimensions equal to a number of the variable parameters;
    determining a second vector in the space based on the second shape;
    determining a difference in magnitude between the first vector and the second vector;
    determining a difference in phase angle between the first vector and the second vector; and
    generating a subsequent PDF based on the difference in magnitude and the difference in phase angle.

3. The method of claim 2, wherein generating the subsequent PDF based on the difference in magnitude and the difference in phase angle includes:
    extrapolating the difference in phase angle to determine a subsequent magnitude;
    extrapolating the difference in phase angle to determine a subsequent phase angle; and
    generating the subsequent PDF based on the subsequent magnitude and the subsequent phase angle.

4. The method of claim 3, further comprising determining a threshold based on a change of total integrated probability, wherein the threshold is associated with the state change.

5. The method of claim 4, wherein a particular state change is detected when an integrated value of the second PDF is greater than an integrated value of the first PDF by an amount equal to or greater than the threshold.

6. The method of claim 2, further comprising determining a projected range of data points of the subsequent data set when the state change occurs.

7. The method of claim 6, wherein determining the projected range of data points of the subsequent data set based on the state change includes integrating the subsequent PDF within particular probability limits.

8. The method of claim 6, wherein the projected range of data points of the subsequent data set is determined without a noise reduction operation.

9. The method of claim 6, wherein the subsequent PDF is determined using a continuous probability distribution function.

10. The method of claim 9, wherein the continuous probability distribution function is a Weibull PDF, and wherein the first PDF parameters and the second PDF parameters correspond to parameters of the Weibull PDF.

11. The method of claim 1, further comprising:
    determining subsequent PDF parameters of the subsequent data set when the state change occurs; and
    determining a projected range of data points of the subsequent data set based on the subsequent PDF parameters.

12. The method of claim 11, wherein the subsequent PDF parameters are determined using a Bayesian decision process, and wherein a number of the projected range of data points is equal to a difference between a number of data points in the first data set and a number of overlapped data points.

13. The method of claim 1, wherein the subsequent data set is subsequent in time or space to the first data set and the second data set, and wherein the second data set overlaps the first data set by at least half of data points in the first data set.

14. The method of claim 1, wherein the first data set and the second data set describe at least one of network traffic, geographic locations of political events, temperature induced mode changes in electronic equipment, crime rates within bounded areas, or a combination thereof, and wherein the state change is determined without using a priori information related to the first data set.

15. An apparatus comprising:
    a processor; and
    a memory coupled to the processor, wherein the memory stores instructions executable by the processor to perform operations comprising:
        performing a comparison, by the processor, of first probability distribution function (PDF) parameters of a first data set to second PDF parameters of a second data set, wherein the first data set and second data set are subsets of a data output, and wherein the first PDF parameters include first shape parameters indicating a first shape of a first PDF of the first data set and the second PDF parameters include second shape parameters indicating a second shape of a second PDF of the second data set, the first data set and the second data set at least partially overlap, the first data set and the second data set are nonlinear and non-stationary, and the first data set and the second data set describes at least one of an amount, a frequency, or a location of particular events;

determining bounding parameter values based on the first PDF parameters;

determining that a state change occurs between the first data set and the second data set when values of the second PDF parameters are not within the bounding parameter values;

generating an indication of the state change to predict future values of a subsequent data set of the data output as third shape parameters in response to determining that the state change occurs; and displaying the indication at a display device.

16. The apparatus of claim 15, wherein the first data set and the second data set describe at least one of network traffic, geographic locations of political events, temperature induced mode changes in electronic equipment, crime rates within bounded areas, or a combination thereof, and wherein determining that the state change occurs includes:

determining the first shape based on the first PDF parameters;

determining second shape based on the second PDF parameters, wherein at least one of the first PDF parameters and the second PDF parameters are variable parameters;

determining a first vector based on the first shape, the first vector defined in a space having a number of dimensions equal to a number of the variable parameters;

determining a second vector in the space based on the second shape;

determining a difference in magnitude between the first vector and the second vector;

determining a difference in phase angle between the first vector and the second vector; and generating a subsequent PDF based on the difference in magnitude and the difference in phase angle.

17. The apparatus of claim 16, wherein generating the subsequent PDF based on the difference in magnitude and the difference in phase angle includes:

extrapolating a subsequent value of the difference in magnitude;

extrapolating a subsequent value of the difference in phase angle; and generating the subsequent PDF based on an extrapolated subsequent value of the difference in magnitude and an extrapolated subsequent value of the difference in phase angle.

18. A computer readable storage device storing instructions that, when executed by a processor, cause the processor to perform operations comprising:

performing a comparison, of first probability distribution function (PDF) parameters of a first data set to second PDF parameters of a second data set, wherein the first data set and second data set are subsets of a data output, and wherein the first PDF parameters include first shape parameters indicating a first shape of a first PDF of the first data set, the second PDF parameters include second shape parameters indicating a second shape of a second PDF of the second data set, the first data set and the second data set partially overlap, and the first data set and the second data set describes at least one of an amount, a frequency, or a location of particular events;

determining bounding parameter values based on the first PDF parameters;

determining that a state change occurs between the first data set and the second data set when values of the second PDF parameters are not within the bounding parameter values;

generating an indication of the state change to predict future values of a subsequent data set of the data output as third shape parameters in response to determining that the state change occurs;

determining a projected range of data points of the subsequent data set when the state change occurs, wherein a subsequent PDF is determined using a continuous probability distribution function, wherein the continuous probability distribution function is a Weibull PDF, and wherein the first PDF parameters and the second PDF parameters correspond to parameters of the Weibull PDF; and displaying the indication at a display device.

19. The computer readable storage device of claim 18, wherein the first data set and the second data set describe at least one of network traffic, geographic locations of political events, temperature induced mode changes in electronic equipment, crime rates within bounded areas, or a combination thereof, and wherein a number of data values of the subsequent data set is equal to a difference between a number of data values in the second data set and a number of data values that are overlapped by the first data set and the second data set.

20. The apparatus of claim 15, wherein the subsequent data set is subsequent in time or space to the first data set and the second data set, and wherein a number of data values of the subsequent data set is equal to a difference between a number of data values in the second data set and a number of data values that are overlapped by the first data set and the second data set.

* * * * *